United States Patent
Fujii et al.

(10) Patent No.: US 8,839,666 B2
(45) Date of Patent: Sep. 23, 2014

(54) VEHICLE SPEED SIGNAL FALSIFICATION DETECTION APPARATUS, VEHICLE SPEED LIMITING APPARATUS, VEHICLE SPEED SIGNAL FALSIFICATION DETECTION METHOD, AND VEHICLE SPEED LIMITING METHOD

(75) Inventors: Satoshi Fujii, Ageo (JP); Chikara Arai, Ageo (JP)

(73) Assignee: UD Trucks Corporation, Ageo-shi (JP)

( * ) Notice: Subject to any disclaimer, the term of this patent is extended or adjusted under 35 U.S.C. 154(b) by 13 days.

(21) Appl. No.: 13/462,023

(22) Filed: May 2, 2012

(65) Prior Publication Data

US 2012/0215428 A1 Aug. 23, 2012

Related U.S. Application Data

(63) Continuation of application No. PCT/JP2010/069510, filed on Nov. 2, 2010.

(30) Foreign Application Priority Data

Nov. 6, 2009 (JP) .................. 2009-254542

(51) Int. Cl.
*G01M 17/007* (2006.01)
*B60W 30/14* (2006.01)
*F02D 29/02* (2006.01)
*B60W 50/04* (2006.01)

(52) U.S. Cl.
CPC ............. *B60W 30/146* (2013.01); *F02D 29/02* (2013.01); *B60W 2520/263* (2013.01); *B60W 50/04* (2013.01)
USPC ..................................... 73/115.08

(58) Field of Classification Search
USPC ............................. 73/115.01, 115.07, 115.08
See application file for complete search history.

(56) References Cited

U.S. PATENT DOCUMENTS

| 5,299,131 | A | * | 3/1994 | Haas et al. ........................ 701/92 |
| 7,574,292 | B2 | * | 8/2009 | Hoeffel et al. ................ 701/32.4 |
| 8,336,364 | B2 | * | 12/2012 | Munko et al. ................... 73/1.37 |
| 2006/0178798 | A1 | * | 8/2006 | Chen ............................... 701/70 |
| 2009/0205401 | A1 | * | 8/2009 | Munko et al. ................... 73/1.37 |
| 2010/0126264 | A1 | * | 5/2010 | Oshiro .......................... 73/146.2 |

FOREIGN PATENT DOCUMENTS

| JP | 4-109077 A | 4/1992 |
| JP | 8-328654 A | 12/1996 |
| JP | 2001-99304 A | 4/2001 |

(Continued)

OTHER PUBLICATIONS

Japanese Office Action, Application No. 2011-539370, Dec. 17, 20113, 6 pages.

*Primary Examiner* — Eric S McCall
(74) *Attorney, Agent, or Firm* — Foley & Lardner LLP

(57) ABSTRACT

A vehicle speed signal falsification detection apparatus has a control unit incorporating a computer. The control unit calculates a vehicle speed according to a pulse signal proportional to the rotational speed of a drive wheel and also calculates a simulated vehicle speed according to a pulse signal proportional to the rotational speed of a driven wheel. Then, the control unit determines, on the basis of the comparison between the vehicle speed and the simulated vehicle speed, whether a vehicle speed signal has been falsified. When the control unit determines that the vehicle speed signal has been falsified, then the control unit outputs a falsification detection signal to another control unit so as to suppress the output of an engine.

14 Claims, 6 Drawing Sheets

(56) References Cited

FOREIGN PATENT DOCUMENTS

| | | |
|---|---|---|
| JP | 2003-148193 A | 5/2003 |
| JP | 2006-62401 A | 3/2006 |
| JP | 2007-100745 A | 4/2007 |
| JP | 2009-213092 A | 9/2009 |

* cited by examiner

VEHICLE SPEED SIGNAL FALSIFICATION DETECTION APPARATUS, VEHICLE SPEED LIMITING APPARATUS, VEHICLE SPEED SIGNAL FALSIFICATION DETECTION METHOD, AND VEHICLE SPEED LIMITING METHOD

This application is a continuation of PCT/JP2010/069510, filed on Nov. 2, 2010.

BACKGROUND OF THE INVENTION

1. Field of the Invention

The present invention relates to a vehicle speed signal falsification detection apparatus (a vehicle speed signal tampering detection apparatus) and to a vehicle speed signal falsification detection method (a vehicle speed signal tampering detection method) for detecting that a vehicle speed signal has been illicitly reduced, and a vehicle speed limiting apparatus and a vehicle speed limiting method for limiting a vehicle speed when a vehicle speed signal has been tempered with.

2. Description of Related Art

Currently, a heavy vehicle in Japan is required to be provided with a speed limiter, which prevents the vehicle from traveling at a speed that exceeds a predetermined vehicle speed, as disclosed in Japanese Laid-Open Patent Application No. 2003-148193. When a vehicle speed reaches a target limiting speed, the speed limiter restricts the amount of fuel injection into an engine, thereby suppressing acceleration.

However, if a vehicle speed signal is falsified by various methods, then even when an actual vehicle speed exceeds a target limiting speed, the amount of fuel injection will not be restricted, allowing a speed limiter to be illegally deactivated.

SUMMARY OF THE INVENTION

Therefore, in view of the above conventional problems, the present invention has an object to provide a vehicle speed signal falsification detection apparatus and a vehicle speed signal falsification detection method for detecting whether a vehicle speed signal has been falsified. Furthermore, in view of the above conventional problems, the present invention has another object to provide a vehicle speed limiting apparatus and a vehicle speed limiting method for limiting a vehicle speed when it has been detected by the comparison between a vehicle speed and a simulated vehicle speed (a quasi-vehicle speed) that a vehicle speed signal has been falsified.

A control unit incorporating a computer calculates a vehicle speed according to a pulse signal that is proportional to the rotational speed of a drive wheel, and calculates a simulated vehicle speed according to a pulse signal that is proportional to the rotational speed of a driven wheel. Then, the control unit determines, by comparing the vehicle speed and the simulated vehicle speed, whether a vehicle speed signal has been falsified.

Furthermore, a first control unit incorporating a computer calculates a vehicle speed according to a pulse signal that is proportional to the rotational speed of a drive wheel, and calculates a simulated vehicle speed according to a pulse signal that is proportional to the rotational speed of a driven wheel. If the first control unit determines, on the basis of a comparison between the vehicle speed and the simulated vehicle speed, that a vehicle speed signal has been falsified, then the first control unit outputs a falsification detection signal to a second control unit incorporating a computer. The output of an engine is restrained when the second control unit receives the falsification detection signal from the first control unit.

A vehicle speed according to a pulse signal that is proportional to the rotational speed of a drive wheel, is calculated, and a simulated vehicle speed according to a pulse signal that is proportional to the rotational speed of a driven wheel, is calculated. Then, based on the comparison between the vehicle speed and the simulated vehicle speed, whether a vehicle speed signal has been falsified is determined. Thus, it is possible to detect that a vehicle speed signal has been falsified.

Furthermore, if the first control unit determines, on the basis of the comparison between the vehicle speed and the simulated vehicle speed, that a vehicle speed signal has been falsified, then a falsification detection signal is output to the second control unit. When the second control unit receives the falsification detection signal, the output of the engine is restrained. Hence, if a vehicle speed signal is falsified, then the acceleration will be suppressed by controlling the output of the engine, thereby restraining the falsification of a vehicle speed signal.

DESCRIPTION OF THE PREFERRED EMBODIMENTS

Hereinafter is a detailed description of the present invention with reference to the accompanying drawings.

Figure 1:
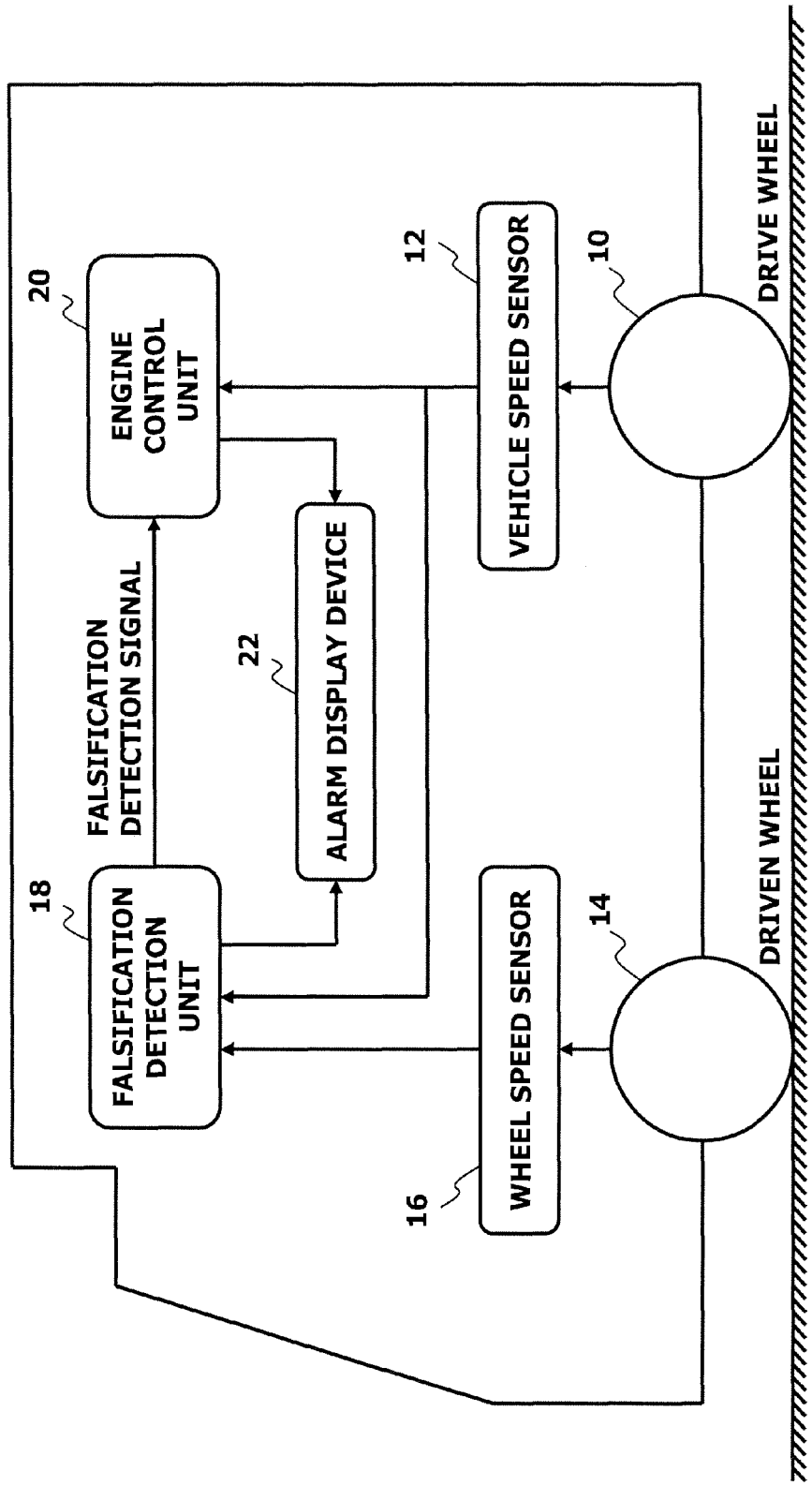
FIG. 1 is a schematic diagram of a vehicle provided with a vehicle speed signal falsification detection apparatus and a vehicle speed limiting apparatus.

FIG. 1 schematically illustrates a vehicle provided with a vehicle speed signal falsification detection device and a vehicle speed limiting apparatus.

A driving force transmitting system from the output shaft of a transmission to drive wheels 10 has a vehicle speed sensor 12 which outputs a pulse signal (a sinusoidal wave or a square wave) proportional to the rotational speed of the drive wheels 10. A driven wheel 14 has a wheel speed sensor 16, which outputs a pulse signal proportional to the rotational speed thereof. The wheel speed sensor 16 may use a wheel speed sensor that is a constituent element of an ABS (Antilock Brake System).

A pulse signal output from the vehicle speed sensor 12 (hereinafter referred to as "the vehicle speed pulse signal") is input to a falsification detection unit 18 incorporating a computer and also input to an engine control unit 20 incorporating a computer. A pulse signal output from the wheel speed sensor 16 (hereinafter referred to as "the wheel speed pulse signal") is input to the falsification detection unit 18. The falsification detection unit 18 and the engine control unit 20 are interconnected through an on-vehicle network, such as a CAN (Controller Area Network). An alarm display device 22 having an alarm lamp and an indicator lamp is connected to the falsification detection unit 18 and the engine control unit 20. The alarm lamp gives warning of an abnormal vehicle speed signal (a falsified vehicle speed signal), and the indicator lamp indicates that the output of an engine is being suppressed. The alarm display device 22 may be built in a combination meter opposing a driver's seat.

The falsification detection unit 18 corresponds to the control unit or the first control unit, while the engine control unit 20 corresponds to the second control unit.

Figure 2:
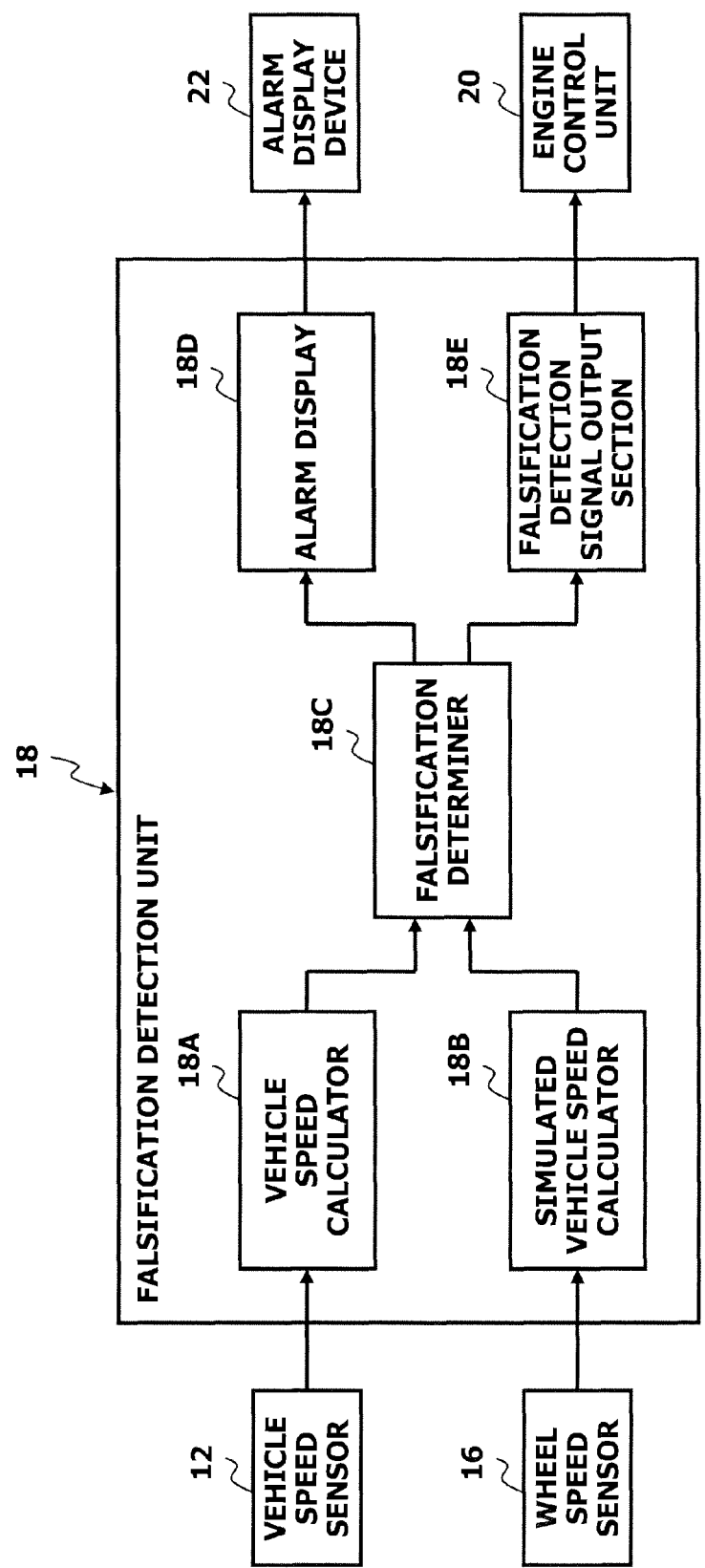
FIG. 2 is a block diagram of various functions built in a falsification detection unit.

The falsification detection unit 18 executes a control program stored in a ROM (Read Only Memory) or the like thereby to operate each of a vehicle speed calculator 18A, a simulated vehicle speed calculator 18B, a falsification determiner 18C, an alarm display 18D, and a falsification detection signal output section 18E, as illustrated in FIG. 2.

The vehicle speed calculator 18A constantly receives vehicle speed pulse signals from the vehicle speed sensor 12 and calculates a vehicle speed Vr, which continues to change. The simulated vehicle speed calculator 18B constantly receives wheel speed pulse signals from the wheel speed sensor 16 and calculates a simulated vehicle speed Vf, which continues to change. The falsification determiner 18C determines, by comparing the vehicle speed Vr and the simulated vehicle speed Vf, whether a vehicle speed signal (the vehicle speed Vr) has been falsified. The alarm display 18D turns on the alarm lamp of the alarm display device 22 when the falsification determiner 18C determines that a vehicle speed signal has been falsified. The falsification detection signal output section 18E outputs a falsification detection signal to the engine control unit 20 when the falsification determiner 18C determines that a vehicle speed signal has been falsified.

Figure 3:
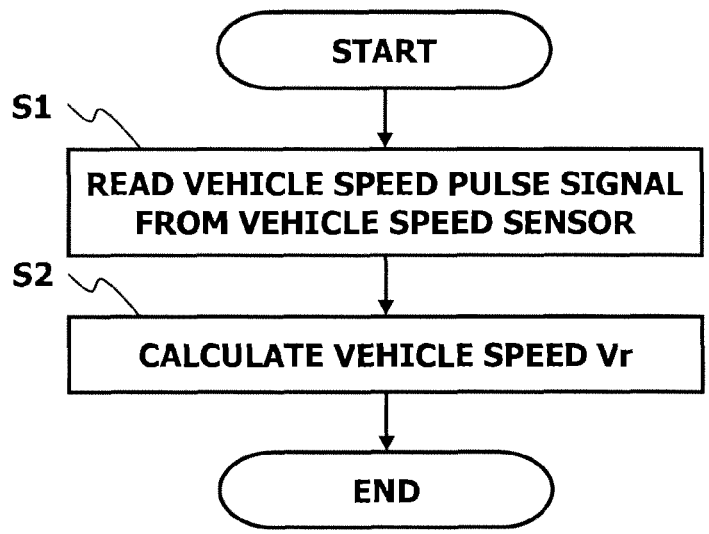
FIG. 3 is a flowchart of the processing for calculating a vehicle speed.

FIG. 3 illustrates a vehicle speed calculation processing repeatedly performed at first predetermined intervals of time by the vehicle speed calculator 18A of the falsification detection unit 18.

In step 1 (abbreviated to "S1" in the accompanying drawings, the same will be applied hereunder), the vehicle speed calculator 18A reads a vehicle speed pulse signal from the vehicle speed sensor 12.

In step 2, the vehicle speed calculator 18A calculates the vehicle speed Vr according to the vehicle speed pulse signal. To be more specific, the vehicle speed calculator 18A measures the period of two consecutive vehicle speed pulse signals and calculates the frequency based on the period. Then, the vehicle speed calculator 18A calculates the vehicle speed Vr based on the frequency of the vehicle speed pulse signal. The vehicle speed Vr is preferably written in, for example, a volatile memory of the computer so as to allow the vehicle speed Vr to be referred to at any point of time (the same applies to a simulated vehicle speed).

Figure 4:
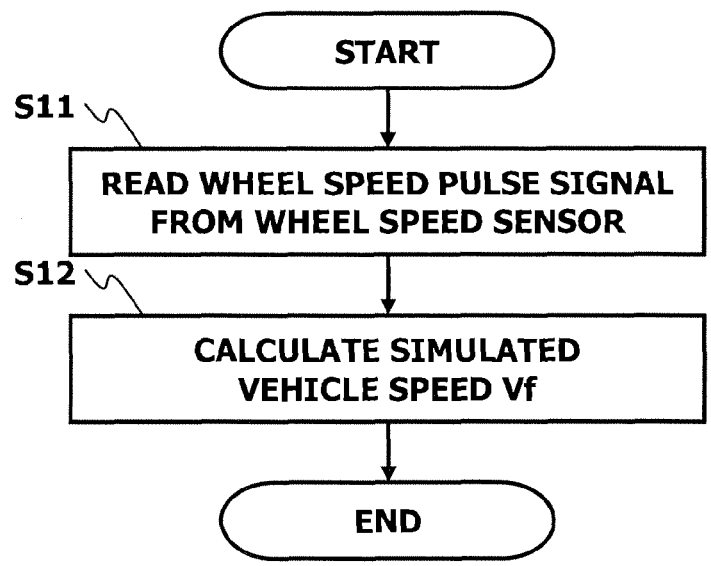
FIG. 4 is a flowchart of the processing for calculating a simulated vehicle speed.

FIG. 4 illustrates simulated vehicle speed calculation processing repeatedly performed at first predetermined intervals of time by the simulated vehicle speed calculator 18B of the falsification detection unit 18.

In step 11, the simulated vehicle speed calculator 18B reads a wheel speed pulse signal from the wheel speed sensor 16.

In step 12, the simulated vehicle speed calculator 18B calculates the simulated vehicle speed Vf according to the wheel speed pulse signal. To be more specific, the simulated vehicle speed calculator 18B measures the period of two consecutive wheel speed pulse signals and calculates the frequency based on the period. Then, the wheel speed calculator 18B calculates the simulated vehicle speed Vf based on the frequency of the wheel speed pulse signal.

Figure 5:
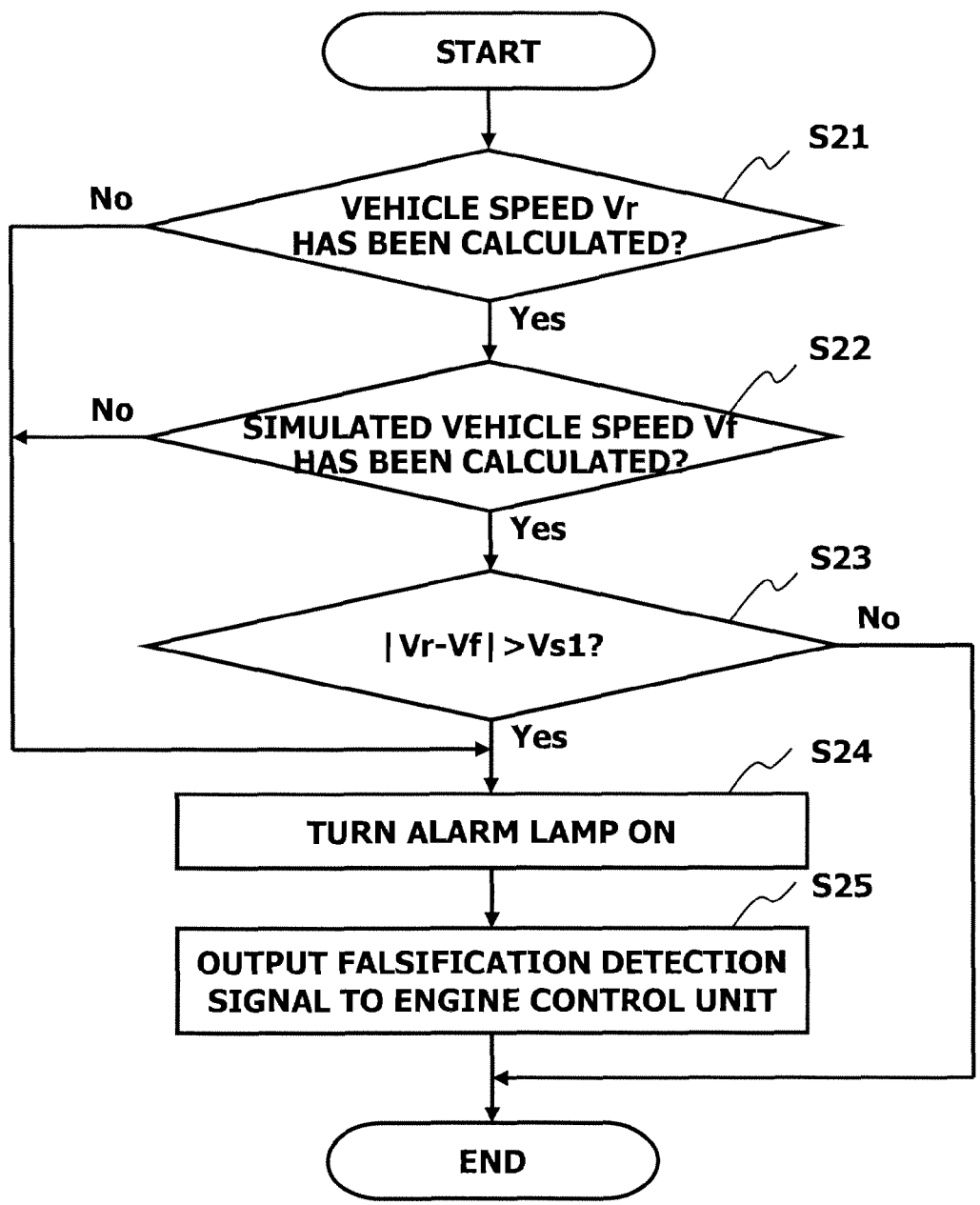
FIG. 5 is a flowchart of the processing for detecting falsification.

FIG. 5 illustrates the falsification detection processing repeatedly performed in cooperation with the falsification determiner 18C, the alarm display 18D and the falsification detection signal output section 18E of the falsification detection unit 18 at second predetermined intervals of time. The second predetermined time may be set to be the same as the first predetermined time.

In step 21, the falsification determiner 18C determines whether the vehicle speed Vr has been calculated by the vehicle speed calculator 18A, that is, whether the vehicle speed sensor 12 has been removed in order to falsify vehicle speed signals. When the falsification determiner 18C determines that the vehicle speed Vr has been calculated, then the processing proceeds to step 22 (Yes), or when the falsification determiner 18C determines that the vehicle speed Vr cannot be calculated, then the processing proceeds to step 24 (No). If the vehicle speed Vr is zero, then the falsification determiner 18C determines that the vehicle speed Vr has been calculated (the same will be applied hereinafter).

In step 22, the falsification determiner 18C determines whether the simulated vehicle speed Vf has been calculated by the simulated vehicle speed calculator 18B, that is, whether the wheel speed sensor 14 has been removed in order to falsify vehicle speed signals. When the falsification determiner 18C determines that the simulated vehicle speed Vf has been calculated, then the processing proceeds to step 23 (Yes), or when the falsification determiner 18C determines that the simulated vehicle speed Vf cannot be calculated, then the processing proceeds to step 24 (No).

In step 23, the falsification determiner 18C determines whether the difference between the vehicle speed Vr and the simulated vehicle speed Vf is greater than a first predetermined value Vs1 ($|Vr-Vf|>Vs1$). In this case, the first predetermined value Vs1 is a threshold value for determining whether a vehicle speed signal has been falsified, and appropriately set in accordance with, for example, the accuracy of calculation of the vehicle speed Vr and the simulated vehicle speed Vf. When the falsification determiner 18C determines that the difference between the vehicle speed Vr and the simulated vehicle speed Vf is greater than the first predetermined value Vs1, then the processing proceeds to step 24 (Yes), or when the falsification determiner 18C determines that the difference between the vehicle speed Vr and the simulated vehicle speed Vf is equal to the first predetermined value Vs1 or less, then the processing is terminated (No).

In step 24, the alarm display 18D turns on the alarm lamp of the alarm display device 22.

In step 25, the falsification detection signal output section 18E outputs the falsification detection signal to the engine control unit 20.

According to the falsification detection unit 18, the vehicle speed Vr according to a vehicle speed pulse signal output from the vehicle speed sensor 12 is calculated, and the simulated vehicle speed Vf according to a wheel speed pulse signal output from the wheel speed sensor 16 is calculated. Then, based on the comparison between the vehicle speed Vr and the simulated vehicle speed Vf, whether a vehicle speed signal has been falsified is determined. When it is determined that the vehicle speed signal has been falsified, then the alarm lamp of the alarm display device 22 will be turned on to warn a vehicle driver or the like of the falsification. Furthermore, when it is determined that the vehicle speed signal has been falsified, then a falsification detection signal is output to the engine control unit 20 so as to restrain the output of the engine by, for example, limiting the fuel injection amount.

Furthermore, when the vehicle speed Vr and the simulated vehicle speed Vf cannot be calculated, then there is a possibility that at least one of the vehicle speed sensor 12 and the wheel speed sensor 16 has been removed or the output signals thereof have been shut off in order to, for example, illegally deactivate a speed limiter. For this reason, when the vehicle speed Vr and the simulated vehicle speed Vf cannot be calculated, then the alarm lamp of the alarm display device 22 is turned on and the falsification detection signal is output to the engine control unit 20, similar to the determination of the falsification of a vehicle speed signal.

The principle of the detection of the falsification of a vehicle speed signal will now be described.

When a vehicle speed signal has not been falsified, then the vehicle speed Vr and the simulated vehicle speed Vf indicate substantially the same speed. However, when the vehicle speed signal has been falsified to deactivate the speed limiter, then a discrepancy between the vehicle speed Vr and the simulated vehicle speed Vf occurs. Thus, it is possible to detect that the vehicle speed signal has been falsified when the difference between the vehicle speed Vr and the simulated vehicle speed Vf exceeds the first predetermined value Vs1.

Figure 6:
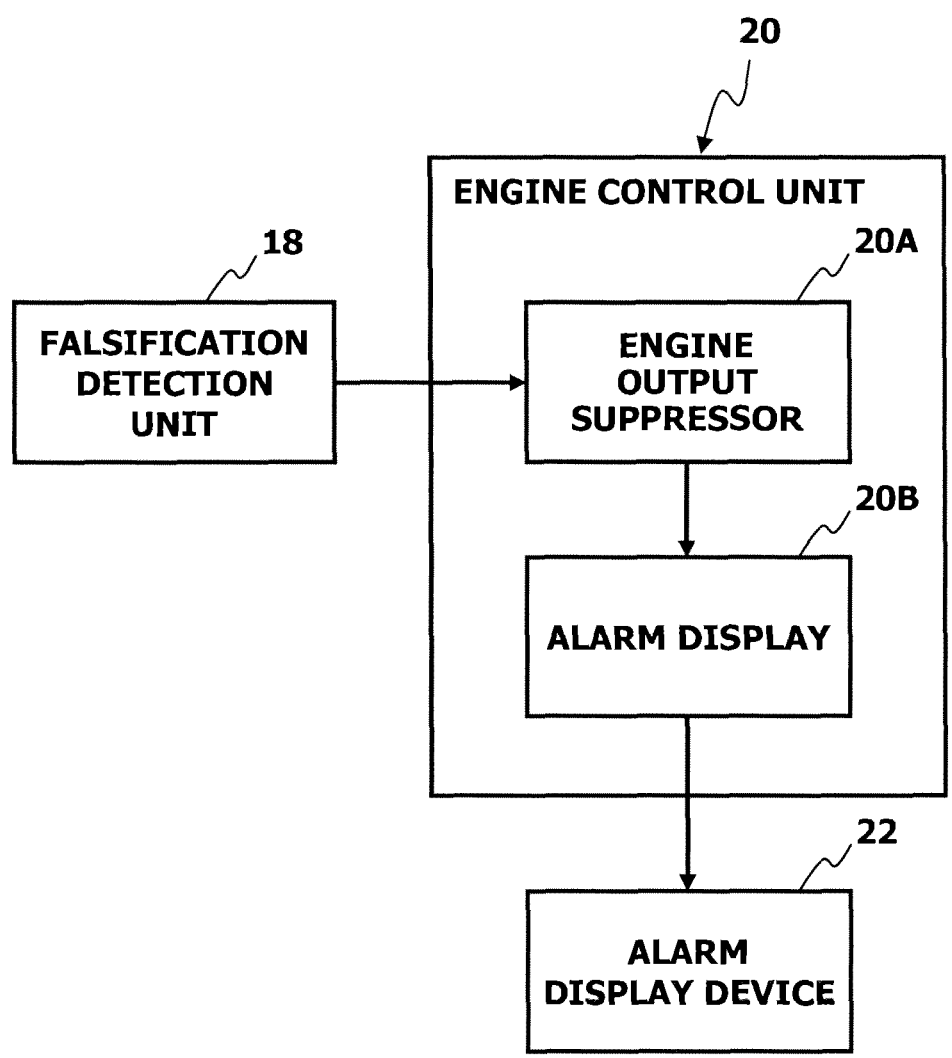
FIG. 6 is a block diagram of the functions built in an engine control unit.

Meanwhile, the engine control unit 20 executes a control program stored in a ROM or the like thereby to operate each of an engine output suppressor 20A and an alarm display 20B, as illustrated in FIG. 6.

The engine output suppressor 20A restrains the output of the engine when a falsification detection signal is received from the falsification detection unit 18 or when the communication between the engine output suppressor 20A and the falsification detection unit 18 is not normal. The alarm display 20B turns on the indicator lamp of the alarm display device 22 when the output of the engine is being restrained by the engine output suppressor 20A. The engine output suppressor 20A also performs the processing for limiting the speed according to a vehicle speed pulse signal output from the vehicle speed sensor 12.

Figure 7:
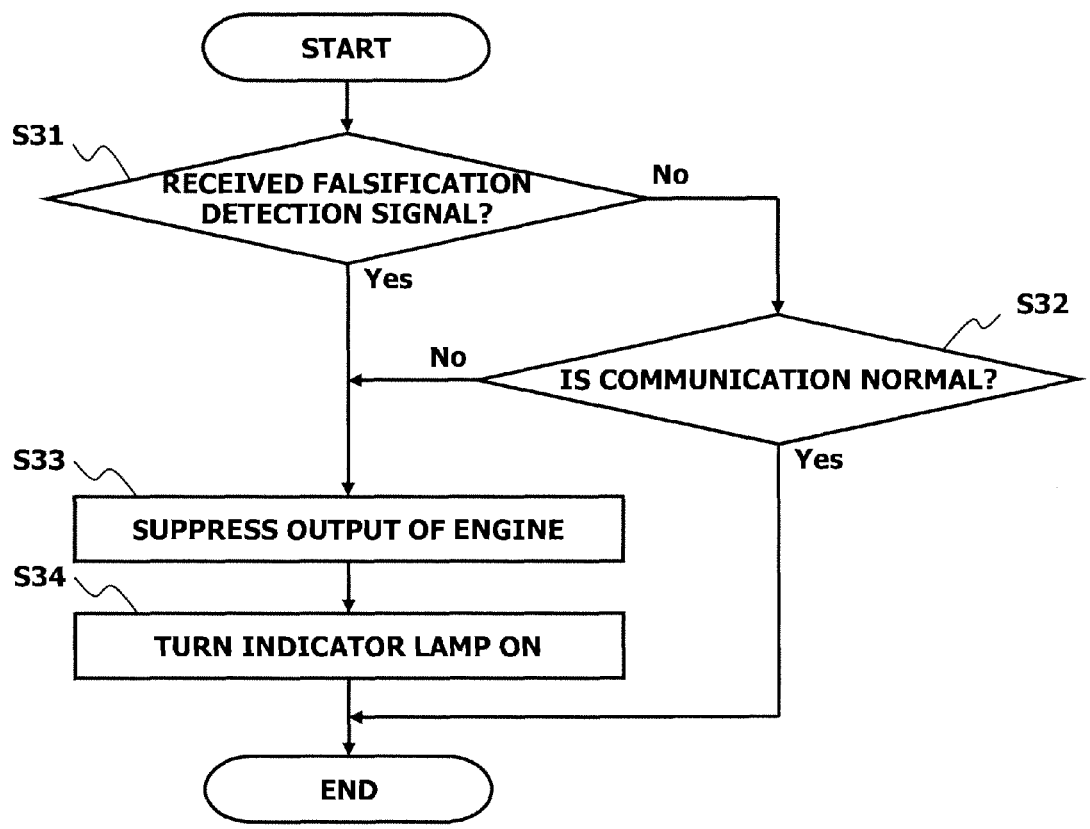
FIG. 7 is a flowchart of the processing for suppressing the output of an engine.

FIG. 7 illustrates the processing for suppressing the output of the engine repeatedly performed in cooperation by the engine output suppressor 20A and the alarm display 20B of the engine control unit 20 at third predetermined intervals of time.

In step 31, the engine output suppressor 20A determines whether a falsification detection signal has been received. When the engine output suppressor 20A determines that a falsification detection signal has been received, then the processing proceeds to step 33 (Yes), or when it determines that no falsification detection signal has been received, then the processing proceeds to step 32 (No).

In step 32, the engine output suppressor 20A determines whether communication between the engine output suppressor 20A and the falsification detection unit 18 is normal. Whether the communication between the engine output suppressor 20A and the falsification detection unit 18 is normal can be determined by, for example, checking whether a predetermined signal is transmitted at regular intervals from the falsification detection unit 18. When the engine output suppressor 20A determines that the communication is normal, then the processing is terminated (Yes), or when it determines that the communication is abnormal, then the processing proceeds to step 33 (No).

In step 33, the engine output suppressor 20A suppresses the output of the engine by, for example, limiting the amount of fuel injected into the engine.

In step 34, the alarm display 20B turns on the indicator lamp of the alarm display device 22.

According to the engine control unit 20, the output of the engine is suppressed when a falsification detection signal is received from the falsification detection unit 18. At this time, the indicator lamp of the alarm display device 22 is turned on to indicate that the output of the engine is being suppressed due to an abnormal vehicle speed signal. Furthermore, when the falsification detection unit 18 is removed so as to prevent a falsification detection signal from being output from the falsification detection unit 18, then the normal communication with the falsification detection unit 18 will be prevented, so that the output of the engine will be suppressed. At this time, the indicator lamp of the alarm display device 22 is turned on to indicate that the output of the engine is being suppressed due to an abnormal vehicle speed signal.

Then, the vehicle driver or the like comes to think that he or she should not falsify vehicle speed signals, because the acceleration slows down due to the suppression output of the engine even when he or she falsifies vehicle speed signals to illegally deactivate the speed limiter. Accordingly, it is possible to discourage the driver or the like to falsify vehicle speed signals.

Possible cases in which a discrepancy between the vehicle speed Vr and the simulated vehicle speed Vf occurs include, in addition to the case in which vehicle speed signals are maliciously falsified, a case in which only the drive wheels 10 are rotated on a free roller to carry out inspection and maintenance or the like. In order to prevent the detection of the falsification of vehicle speed signals from being carried out when the vehicle is on the free-roller, in step 23 in FIG. 5, it may be determined that a vehicle speed signal has been falsified when the value obtained by subtracting the vehicle speed Vr from the simulated vehicle speed Vf is greater than a second predetermined value Vs2 (Vf−Vr>Vs2). The second predetermined value Vs2 is to be set to zero or more.

More specifically, during the free-roller travel, the drive wheels 10 rotate, whereas the driven wheels 14 do not rotate, so that the vehicle speed Vr is larger than the simulated vehicle speed Vf. At this time, the value obtained by subtracting the vehicle speed Vr from the simulated vehicle speed Vf is a negative value, so that the value is not exceed the second predetermined value Vs2 and it is not be determined that a vehicle speed signal has been falsified. Meanwhile, falsifying a vehicle speed signal to illegally deactivate the speed limiter causes the vehicle speed Vr to be less than an actual vehicle speed, so that the simulated vehicle speed Vf is greater and the value obtained by subtracting the vehicle speed Vr from the simulated vehicle speed Vf is a positive value. Thus, a maliciously falsified vehicle speed signal can be detected by properly setting the second predetermined value Vs2, taking errors or the like of the vehicle speed Vr and the simulated vehicle speed Vf into account.

The falsification detection unit 18 and the engine control unit 20 may be combined into one unit. On the other hand, however, making the falsification detection unit 18 and the engine control unit 20 separate allows the embodiment of the present invention to be easily applied to an existing vehicle by adding a small change to the control program of the engine control unit 20.

It should be noted that the entire contents of Japanese Patent Application No. 2009-254542, filed on Nov. 6, 2009, on which the convention priority is claimed is incorporated herein by reference.

It should also be understood that many modifications and variations of the described embodiments of the invention will occur to a person having an ordinary skill in the art without departing from the spirit and scope of the present invention as claimed in the appended claims.

What is claimed is:

1. A vehicle speed signal falsification detection apparatus, comprising:
   a vehicle speed sensor which outputs a pulse signal proportional to a rotational speed of a drive wheel;
   a wheel speed sensor which outputs a pulse signal proportional to a rotational speed of a driven wheel; and
   a control unit which includes a computer,
   wherein the control unit calculates a vehicle speed according to a pulse signal output from the vehicle speed sensor, calculates a simulated vehicle speed according to a pulse signal output from the wheel speed sensor, determines, on the basis of comparison between the vehicle speed and the simulated vehicle speed, whether a vehicle speed signal has been falsified, and forbids the determining whether the vehicle speed signal has been falsified when a value obtained by subtracting the vehicle speed from the simulated vehicle speed is equal to or less than a predetermined value.

2. The vehicle speed signal falsification detection apparatus according to claim 1, wherein the control unit outputs a falsification detection signal to an engine control unit that electronically controls an engine when the control unit determines that a vehicle speed signal has been falsified.

3. The vehicle speed signal falsification detection apparatus according to claim 1, further comprising an alarm lamp which warns that a vehicle speed signal has been falsified,
   wherein the control unit turns the alarm lamp on when the control unit determines that a vehicle speed signal has been falsified.

4. The vehicle speed signal falsification detection apparatus according to claim 3, wherein herein the control unit turns the alarm lamp on when calculation of the vehicle speed and the simulated vehicle speed is disabled.

5. A vehicle speed limiting apparatus comprising:
   a vehicle speed sensor which outputs a pulse signal proportional to a rotational speed of a drive wheel;
   a wheel speed sensor which outputs a pulse signal proportional to a rotational speed of a driven wheel;
   a first control unit which includes a computer; and
   a second control unit which includes a computer,
   wherein the first control unit calculates a vehicle speed according to a pulse signal output from the vehicle speed sensor, calculates a simulated vehicle speed according to a pulse signal output from the wheel speed sensor, and outputs a falsification detection signal to the second control unit when the first control unit determines, on the basis of comparison between the vehicle speed and the simulated vehicle speed, that a vehicle speed signal has been falsified,
   wherein the second control unit suppresses an output of an engine when the second control unit receives a falsification detection signal from the first control unit.

6. The vehicle speed limiting apparatus according to claim 5, wherein the first control unit determines that a vehicle speed signal has been falsified when a difference between the vehicle speed and the simulated vehicle speed exceeds a predetermined value.

7. The vehicle speed limiting apparatus according to claim 5, wherein the first control unit determines that a vehicle speed signal has been falsified when a value obtained by subtracting the vehicle speed from the simulated vehicle speed exceeds a predetermined value.

8. The vehicle speed limiting apparatus according to claim 5, wherein the first control unit outputs a falsification detection signal to the second control unit when calculation of the vehicle speed and the simulated vehicle speed is disabled.

9. The vehicle speed limiting apparatus according to claim 5, wherein the second control unit suppresses an output of an engine when communication with the first control unit is prevented.

10. The vehicle speed limiting apparatus according to claim 5, further comprising an indicator lamp which indicates that the output of the engine is being suppressed,
    wherein the second control unit turns the indicator lamp on when the output of the engine is suppressed.

11. The vehicle speed limiting apparatus according to claim 5, further comprising an alarm lamp which warns that a vehicle speed signal has been falsified,
    wherein the first control unit turns the alarm lamp on when the first control unit determines that a vehicle speed signal has been falsified.

12. The vehicle speed limiting apparatus according to claim 11, wherein the first control unit turns the alarm lamp on when calculation of the vehicle speed and the simulated vehicle speed is disabled.

13. A vehicle speed signal falsification detection method in which a control unit including a computer executes the following steps, the steps comprising:
    calculating a vehicle speed according to a pulse signal proportional to the rotational speed of a drive wheel, and a simulated vehicle speed according to a pulse signal proportional to the rotational speed of a driven wheel;
    determining, on the basis of comparison between the vehicle speed and the simulated vehicle speed, whether a vehicle speed has been falsified, and
    forbidding the determining whether the vehicle seed has been falsified when a value obtained by subtracting the vehicle speed from the simulated vehicle speed is equal to or less than a predetermined value.

14. A vehicle speed limiting method
    in which a first control unit including a computer executes the following steps, the steps comprising:
    calculating a vehicle speed according to a pulse signal proportional to the rotational speed of a drive wheel, and a simulated vehicle speed according to a pulse signal proportional to the rotational speed of a driven wheel; and
    outputting a falsification detection signal to a second control unit including a computer when falsification of a vehicle speed signal is determined on the basis of comparison between the vehicle speed and the simulated vehicle speed, and
    the second control unit executes the following step, the step comprising:
    suppressing the output of an engine when the falsification detection signal is received from the first control unit.

* * * * *